(12) United States Patent
Dubin et al.

(10) Patent No.: US 7,654,676 B2
(45) Date of Patent: *Feb. 2, 2010

(54) PUPIL MISMATCH IN A COLLIMATED DISPLAY SYSTEM

(75) Inventors: Matthew B. Dubin, Tucson, AZ (US); Brent D. Larson, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/165,372

(22) Filed: Jun. 30, 2008

(65) Prior Publication Data

US 2008/0266529 A1    Oct. 30, 2008

Related U.S. Application Data

(63) Continuation of application No. 11/036,205, filed on Jan. 14, 2005, now Pat. No. 7,399,088.

(51) Int. Cl.
*G03B 21/14*    (2006.01)
*G02B 27/30*    (2006.01)
*G02B 5/00*    (2006.01)
*H04N 5/74*    (2006.01)
*G02F 1/00*    (2006.01)

(52) U.S. Cl. ............................ 353/97; 353/88; 359/641; 359/894; 348/759

(58) Field of Classification Search ................... 353/85, 353/30, 31, 86, 88–91, 93, 97, 122; 359/13, 359/630, 641, 894; 345/7, 8; 349/5–8, 11; 348/115, 744, 750, 758, 759, 771

See application file for complete search history.

(56) References Cited

U.S. PATENT DOCUMENTS

| 4,375,315 A | 3/1983 | Lacombat et al. |
|---|---|---|
| 4,613,207 A | 9/1986 | Fergason |
| 4,728,185 A | 3/1988 | Thomas |
| 5,701,132 A | 12/1997 | Kollin et al. |
| 6,169,621 B1 | 1/2001 | Deter et al. |
| 6,469,820 B1 | 10/2002 | Mushiake et al. |
| 7,399,088 B2 * | 7/2008 | Dubin et al. .................. 353/97 |
| 2004/0004584 A1 | 1/2004 | Hebert |

* cited by examiner

*Primary Examiner*—Rochelle-Ann J Blackman
(74) *Attorney, Agent, or Firm*—Ingrassia Fisher & Lorenz, P.C.

(57) ABSTRACT

An image projection system has a first lens with a defined entrance pupil. An image source has an image field and a defined exit pupil. The exit pupil of the image source is configured such that the exit pupil of the image source underfills the entrance pupil of the lens for portions of the image source that are not in the center portion of the image field.

20 Claims, 6 Drawing Sheets

FIG. 7 ved in a defined cone having its center parallel to
PUPIL MISMATCH IN A COLLIMATED DISPLAY SYSTEM

CROSS-REFERENCE TO RELATED APPLICATION

This is a continuation of application Ser. No. 11/036,205, filed Jan. 14, 2005.

FIELD OF THE INVENTION

The invention relates generally to lens configuration in a display system, and more specifically to mismatching pupils in a collimated display system.

BACKGROUND OF THE INVENTION

Projectors, such as those used to project images in a conference room, to project data in an aircraft's head-up display (HUD), or to project a movie image in a theater, often rely upon a light source behind an image medium to provide the light that is projected to form the image. The light passes through the image medium, such as a layer of film or a liquid crystal display panel, or perhaps is produced by illuminating phosphors on a cathode ray tube, to produce a light image that is projected through a series of lenses toward a target.

Design and construction of the lens assemblies plays a substantial role in the resulting quality of the projected image. Antireflective coatings and optical coupling are used to reduce reflections between lens elements. Specialized glass types are used to reduce chromatic aberration in which different colors of light take different paths through the lens. Careful shaping of the lens elements to correctly redirect problematic off-center light rays that might produce an out-of-focus image with traditional round or flat lens surfaces is also employed. Each of these techniques are commonly employed to ensure that an image having the desired degree of focus, contrast, and brightness can be produced.

But, these techniques are technically complex to employ, and can require sophisticated and expensive production equipment and materials. A user of even relatively expensive binoculars or camera lenses may well notice that images are less sharp near the edges of an image, and that different colors begin to form separate images near the image edges.

It is also desirable in many applications to reduce the quantity of light that proceeds through a lens group but does not accurately contribute to the desired viewing area in the observation plane. Sometimes various other techniques can be employed in a lens system to reduce unwanted light from proceeding through the lens elements, such as where vignetting reduces the number of light rays produced from off-center light sources that proceed through a series of lens elements. This is often undesirable for display applications, though, as the image formed by a solid image such as a frame of film, a CRT image, or an LCD shutter comprises useful light rays emitted from off-center portions of the image. Shuttering or blocking undesired light rays near the observation plane can reduce the demands placed upon the lens elements in handling off-axis light rays that are considered undesirable, but is impractical for many of the previously discussed applications.

It is desired to have a lens system in which the performance requirements on lenses can be relaxed while still maintaining acceptable image quality.

SUMMARY OF THE INVENTION

The present invention comprises in one embodiment an image projection system having a first lens with a defined entrance pupil, and an image source having an image field and a defined exit pupil. The exit pupil of the image source is configured such that the exit pupil of the image source underfills the entrance pupil of the lens for portions of the image source that are not in the center portion of the image field.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Figure 1:
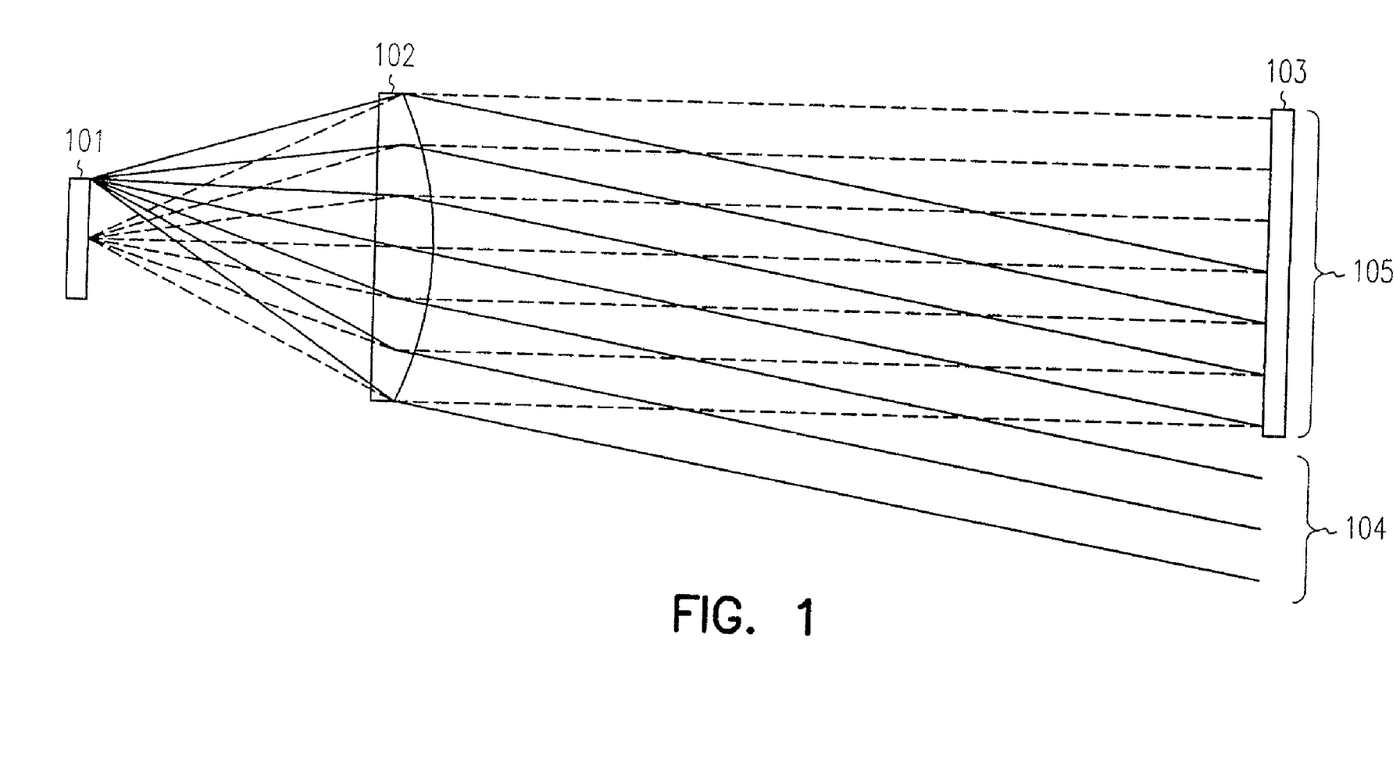
FIG. 1 shows a diagram illustrating light paths through a simple lens, as may be adapted to practice some embodiments of the present invention.

FIG. 1 shows a diagram illustrating light paths through a simple lens, as may be adapted to practice some embodiments of the present invention. An image is created on a light valve 101, which in various embodiments of the invention is a liquid crystal display, or another medium such as film. In an alternate embodiment of the invention, the light valve 101 is replaced with another image source, such as a reflective spatial light modulator or cathode ray tube (CRT). The produced image comprises light that shines from each illuminated portion of the light valve 101 or other image device toward a lens 102. The lens receives and collimates those light rays from the light valve 101 and sends them in collimated form toward the projection surface 103. The projection surface is located in what is termed the observation plane, which is the plane in which the projected image is properly collimated or focused and is intended to be observed. The projection surface can be for example a physical combiner or screen, or alternately be a prescribed region within the observation plane from which the display is to be visible.

The dashed lines in FIG. 1 illustrate how light rays from a point central to the light valve 101 are received by the lens 102 at various points, and are collimated and projected onto the projection surface 103. Similarly, the solid lines show how light rays from a point on an edge of the light valve 101 are received by the lens, and are collimated and projected toward the projection surface 103. Although all rays from the edge point represented by the solid lines reach the observation plane, some rays 104 do not fall on the projection surface 103, and therefore do not contribute usefully to production of the intended projected image.

These undesired rays could be blocked by placing a light blocking material having a certain size opening, or an aperture, between the light valve 101 and the lens 102, but such an aperture could not be positioned so that it blocked only the undesired rays B some desired light rays from other points on the light valve 101 would also be blocked. An aperture could be placed near the observation plane or the projection surface 103, but it is usually undesirable to place a baffle or aperture outside of the lens group and near the projection surface and observers.

When a display element having a controllable angular light output is used, it is possible to configure the backlight so that the light emitted from the display element is vignetted or underfills the lens element. This is discussed in greater detail with respect to FIGS. 2A-2F, which shows how pupil mismatch between the display element and collimating lens can produce vignetting, consistent with an embodiment of the present invention. The entrance pupil of a lens is simply the image of the aperture as seen from the entrance to the lens, while the exit pupil is the image of the aperture of the lens as seen from the axis of the observation plane on the exit of the lens. With no baffles, the exit pupil and entrance pupil of a single lens is determined by the lens aperture. The entrance pupil therefore determines the cone of light that enters the lens and will be projected through the aperture, while the exit pupil determines the cone of light that exits the lens and has passed through the aperture.

In a system in which the display element has a controllable angular output, the display element also has an effective exit pupil. This exit pupil is typically matched to or slightly greater than the entrance pupil of the lens so that it overfills the lens entrance pupil, as the greatest expense and the limit of a lens system's performance is typically the size of the lenses. In this example embodiment of the invention, however, the entrance pupil of the lens is deliberately underfilled by off-axis parts of the image, or by portions of the image that are not very close to the center of the display element.

Figure 2A:
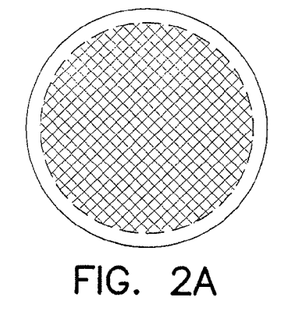
FIGS. 2A-2F illustrate pupil mismatch between an image display element and collimating lens, consistent with an embodiment of the present invention.
Figure 2B:
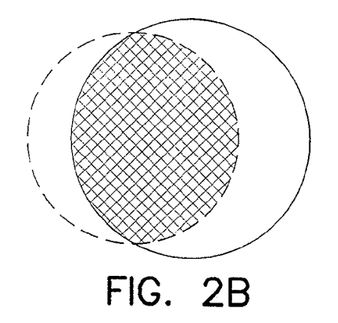
Figure 2C:
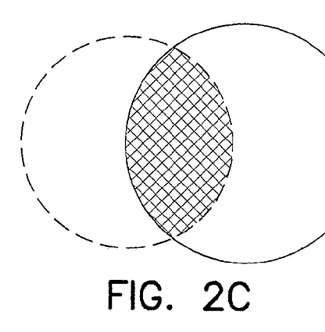
Figure 2D:
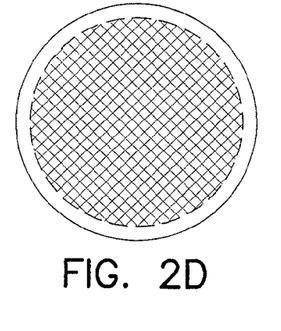
Figure 2E:
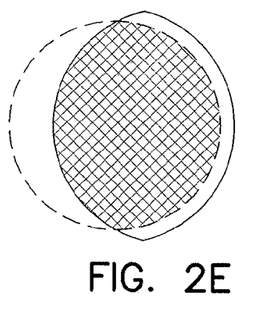
Figure 2F:
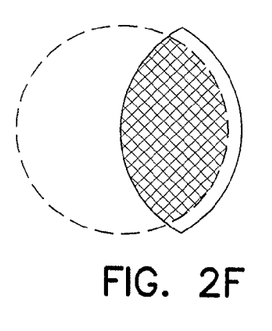

The central-most portion of the display element fills the collimating lens entrance pupil, as is shown at 2A. With round exit and entrance pupils, the entrance pupil of the lens is deliberately underfilled by the exit pupil of the display element for light emitted off-axis, such as from the mid-field (between the central axis and edges of the display element) or from the full-field (edges of the display element). The mid-field underfill using a round exit pupil for the display element is illustrated at 2B, while the full-field underfill using a round exit pupil for the display element is shown at 2C.

The mid-field diagram 2E and the full-field diagram 2F show how a significant portion of the light provided by the backlight exit pupil falls outside the entrance pupil of the collimating lens system. In a more sophisticated embodiment of the invention, this unused light can be eliminated by shaping the exit pupil of the display element to be non-round off the center axis. This is illustrated in mid-field diagram 2E, which shows how the exit pupil of the backlit display element is contoured to eliminate transmission of most of the light not entering the entrance pupil in mid-field diagram 2B. Similarly, the exit pupil of the backlit display element at full-field is tapered as shown at 2F to eliminate transmission of most of the light not entering the entrance pupil of the lens, which comparison with round pupil diagram 2C shows is the majority of the light transmitted by the full-field or edge portions of the backlit display element.

Figure 3:
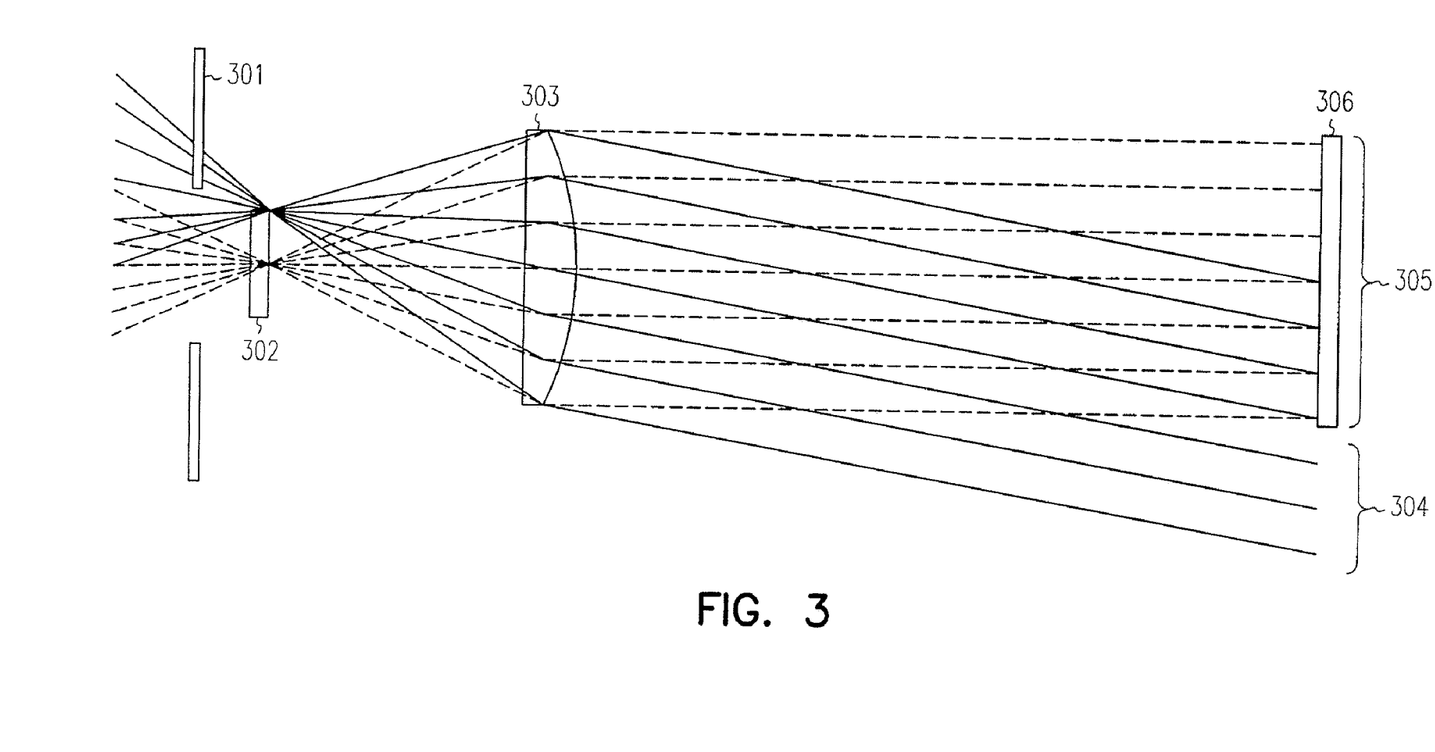
FIG. 3 illustrates use of a baffle to mismatch a backlit display element's exit pupil to underfill a collimating lens element's entrance pupil, consistent with an embodiment of the present invention.

FIG. 3 illustrates one method of mismatching the backlit display element's exit pupil to underfill the collimating lens element's entrance pupil consistent with an embodiment of the present invention. A baffle defining the exit pupil 301 shows how light rays projected through backlit display element 302 are eliminated to underfill the collimating lens 303 for mid-field and full-field image portions. The undesired rays 304 are therefore eliminated, and are not projected through the collimating lens 303. The desired rays 305 still reach the projection surface 306, and contribute to formation of a projected image.

Figure 4:
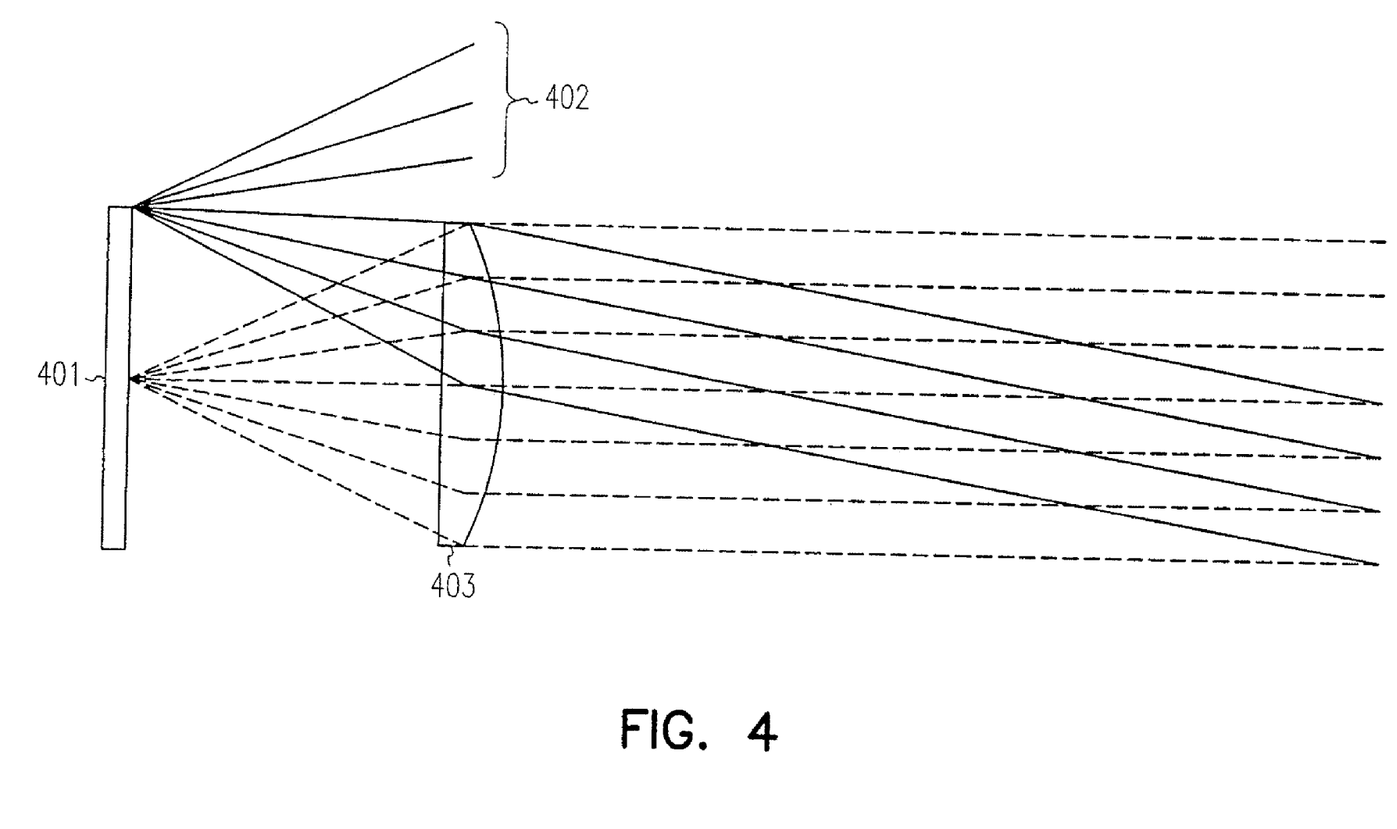
FIG. 4 illustrates how light emitted from a display element can be emitted in a defined cone having its center parallel to the main axis of the optical system, consistent with an embodiment of the present invention.

It is not necessary to use a physical aperture such as is shown at 301 to create the desired exit pupil. In some embodiments of the invention, the light source itself is tailored to emit light in only the desired directions, and the edge of the exit pupil ranges from being sharply defined or to being a gradual or smooth function. For example, a telecentric backlight with a sharp cutoff angle is used in one embodiment with a non-telecentric collimating lens to obtain a similar result. This approach is illustrated in FIG. 4, which shows how light emitted from the display element 401 is emitted in a defined cone having its center parallel to the main axis of the optical system, consistent with some embodiments of the invention.

The backlit display 401 is lit with a backlight having a telecentric radiation pattern, as shown by the solid lines. While some rays 402 fall outside the entrance pupil of the lens 403, these rays can be easily blocked with a shutter or by further profiling of the backlight radiation pattern. It is significant that no solid lines representing rays from the top full-field position of the display element 401 fall onto the lower half of lens 403, as this both simplifies the design requirements of lens 403 and eliminates the unused and undesired rays such as 304 of FIG. 3 or 104 of FIG. 1. Lens 403 in various example embodiments takes the form of simplified or complex optical systems including but not limited to refractive, reflective, diffractive, or holographic elements or combinations thereof, and is designed to control light rays which lie within the overlap of the lens entrance pupil and the exit pupil of the backlit display.

Similarly, when other technologies such as CRT projection are used, angle-limiting films and other technologies can produce a substantially similar result by directing light rays emitted from the display device. Various other devices such as screens and micromirror devices can similarly be used by limiting or controlling the direction and pattern of radiation from the micromirrors and through configuration of the size and distance to the illuminating lamp.

Figure 5:
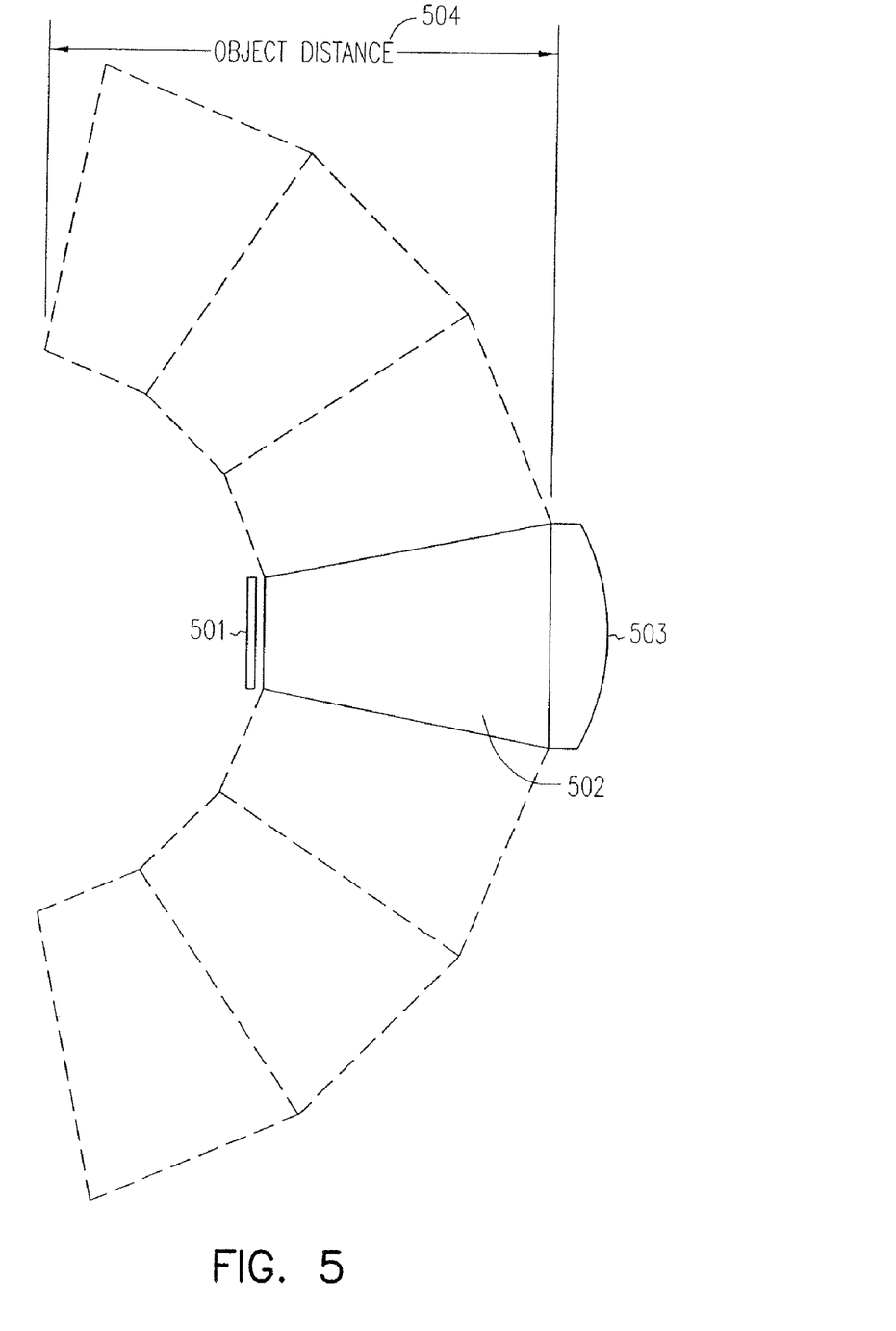
FIG. 5 illustrates how a backlight exit pupil can be controlled to be effectively near infinity, consistent with an embodiment of the present invention.

Several methods exist to provide a light source having a specific exit pupil characteristic as is described in the preceding examples. FIG. 5 illustrates how the backlight exit pupil can be controlled to be effectively near infinity, producing radiation of a similar size light cone and in the same direction as is shown in FIG. 4. Light from light source 501 is conducted through a light pipe 502 to a lens 503. The specularly reflective sides of light pipe 502 give rise to a plurality of effective virtual light guides 512 as depicted in FIG. 5 by the dashed lines. These are not physically present, but illustrate what is observed in the multiple reflections as seen from the perspective of lens 503. Each virtual light guide has a corresponding virtual light source 511 which is a first or higher order reflection of light source 501, provided the light distribution angle from light source 501 is sufficiently broad. The effective edge of the segmented source made up of light source 501 and virtual light sources 511 defines an effective aperture for the backlight source, and together with lens 503 defines the exit pupil of the backlight. When used as a backlight for a collimated display, such as the backlit display 401 of FIG. 4, the collimating lens 403 is therefore not filled for all field points, and only light that passes through the overlap of the backlight exit pupil and the lens entrance pupil will be passed through the optical system. In this configuration, the object distance 504 is equal to the focal length of the lens 503, resulting in an effective infinite exit pupil for the image source from the display element 501. This removes the undesired rays that are optically difficult to correct and do not contribute to the projected image volume viewable on the projection surface. If telecentricity is not desired, for example to alter the overlap characteristics of the backlight exit pupil and the lens entrance pupil, the focal length of lens 503 can differ from the object distance 504, thereby moving the exit pupil of the backlight away from infinity.

The light source used in such an embodiment is desirably spatially and angularly uniform in radiation, but can in various embodiments be any light source.

Fluorescent lamps, light-emitting diodes (LEDs), arc lamps, and various cavity and diffuser configurations will be useful in various embodiments to provide such illumination.

Figure 6:
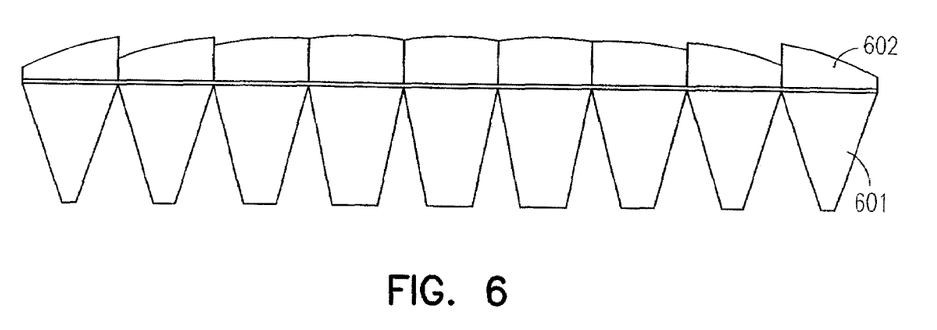
FIG. 6 illustrates an array of light pipes and lens elements, consistent with an embodiment of the present invention.
Figure 7:
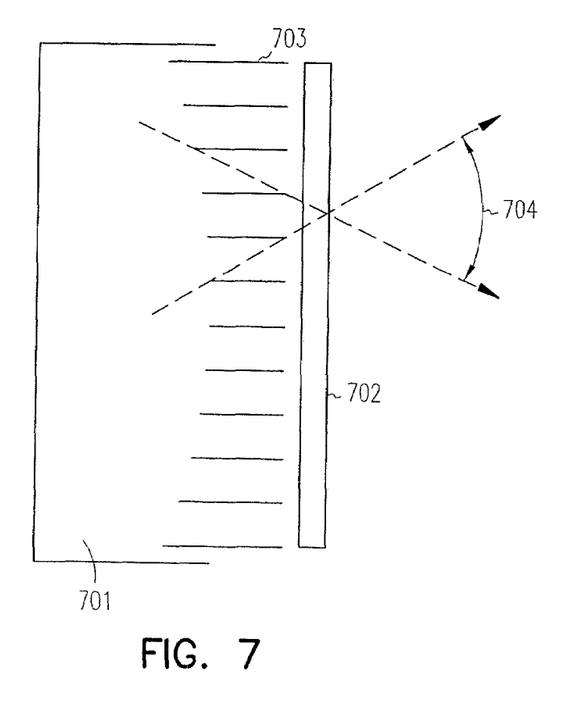
FIG. 7 illustrates use of an array of baffles to produce a light source exit pupil of infinity, consistent with an embodiment of the present invention.

The configuration shown in FIG. 5 may be undesirable in some applications due to the long length of the light pipe for relatively large image sources. This can be addressed by tailoring the light pipe's light-carrying elements and the respective entrance and exit aspect ratios and configurations, as well as by tailoring the focal point of the lens at various points on the lens. An array of light pipes and lenses can similarly be constructed to change angular distribution of emitted light as a function of position, as is shown generally by the array of light pipes 601 and lens elements 602 in FIG. 6. Also, FIG. 7 illustrates generally how a light source exit pupil of infinity can be effectively achieved by an array of baffles, each baffle path producing a substantially similar distribution of light. A light source in light chamber 701 illuminates the display element 702 through the baffles 703, which produce a series of cones of light having a similar directional and angular dispersion as shown at 704.

A variety of other methods, including use of mirrors, prismatic structures, lenses, and baffles are known in the art as being capable of tailoring the directivity and dispersion pattern of light. Any of these may be used to produce the desired pupil mismatch described herein and as recited in the pending claims. Each of these methods will be employed to effectively control the exit pupil or to tailor the radiation of light from a display element, so that undesired rays can be eliminated. The resulting reduction in lens design demands and in wasted or undesired projected rays will result in a more efficient and less expensive projection system in many embodiments, and can therefore be employed to produce a superior optical projection system.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. An image projection system, comprising:
a lens having an entrance pupil;
an image source comprising an image field and having an exit pupil, the exit pupil of the image source configured such that the exit pupil of the image source underfills the entrance pupil of the lens for portions of the image source that are not in the center portion of the image field and fills the entrance pupil of the lens substantially less for portions of the image source that are not in the center portion of the image field than for portions of the image source that are in the center of the image field.

2. The image projection system of claim 1, wherein the exit pupil of the image source at least fills the entrance pupil of the lens at the center of the image field.

3. The image projection system of claim 1, wherein the lens is a collimating lens.

4. The image projection system of claim 1, wherein the lens is an element of a lens assembly.

5. The image projection system of claim 1, wherein the image source comprises a liquid crystal display.

6. The image projection system of claim 1, wherein the image source is a backlit light valve.

7. The image projection system of claim 6, wherein the backlight is configured to produce the desired image source exit pupil.

8. An image projection system, comprising:
an image source comprising an image field and having an exit pupil, the exit pupil of the image source configured such that the exit pupil of the image source underfills the entrance pupil of a lens for portions of the image source that are not in the center portion of the image field and fills the entrance pupil of the lens substantially less for portions of the image source that are not in the center portion of the image field than for portions of the image source that are in the center of the image field.

9. The image projection system of claim 8, wherein the exit pupil of the image source at least fills the entrance pupil of the lens at the center of the image field.

10. The image projection system of claim 8, wherein the image source comprises a liquid crystal display.

11. The image projection system of claim 8, wherein the image source is a backlit light valve.

12. The image projection system of claim 11, wherein the backlight is configured to produce the desired image source exit pupil.

13. A method of producing a projected image, comprising:
projecting an image from an image source onto a lens, the image source comprising an image field and having an exit pupil, the exit pupil of the image source configured such that the exit pupil of the image source underfills the entrance pupil of the lens for portions of the image source that are not in the center portion of the image field and fills the entrance pupil of the lens substantially less for portions of the image source that are not in the center portion of the image field than for portions of the image source that are in the center of the image field.

14. The method of producing a projected image of claim 13, wherein the exit pupil of the image source at least fills the entrance pupil of the lens at the center of the image field.

15. The method of producing a projected image of claim 13, wherein the lens is a collimating lens.

16. The method of producing a projected image of claim 13, wherein the lens is an element of a lens assembly.

17. The method of producing a projected image of claim 13, wherein the image source comprises a liquid crystal display.

18. The method of producing a projected image of claim 13, wherein the image source is a backlit light valve.

19. The method of producing a projected image of claim 18, wherein the backlight is configured to produce the desired image source exit pupil.

20. The method of producing a projected image of claim 13, further comprising optimizing the lens for each portion of the image field over the corresponding portion of the lens entrance pupil which is filled by the exit pupil of the image source for that portion of the image field.

* * * * *